(12) United States Patent
Davis et al.

(10) Patent No.: US 12,472,693 B2
(45) Date of Patent: Nov. 18, 2025

(54) ADDITIVE MANUFACTURING-COUPLED DIGITAL TWIN ECOSYSTEM

(71) Applicant: General Electric Company, Schenectady, NY (US)

(72) Inventors: Stephen Jonathan Davis, Eastleigh (GB); Jonathan Mark Dunsdon, Murphys, CA (US)

(73) Assignee: General Electric Company, Schenectady, NY (US)

(*) Notice: Subject to any disclaimer, the term of this patent is extended or adjusted under 35 U.S.C. 154(b) by 287 days.

(21) Appl. No.: 16/901,147

(22) Filed: Jun. 15, 2020

(65) Prior Publication Data

US 2020/0391446 A1 Dec. 17, 2020

Related U.S. Application Data

(60) Provisional application No. 62/862,011, filed on Jun. 14, 2019, provisional application No. 62/862,016, filed on Jun. 14, 2019.

(51) Int. Cl.
  *B29C 64/393* (2017.01)
  *B29C 64/171* (2017.01)
  (Continued)

(52) U.S. Cl.
  CPC .......... *B29C 64/393* (2017.08); *B29C 64/171* (2017.08); *B29C 64/188* (2017.08);
  (Continued)

(58) Field of Classification Search
  CPC ... B29C 64/393; B29C 64/171; B29C 64/188; G05B 17/02; B33Y 10/00; B33Y 30/00; B33Y 50/02; B33Y 40/20; B33Y 40/10
  See application file for complete search history.

(56) References Cited

U.S. PATENT DOCUMENTS

| 6,067,486 A | 5/2000 | Aragones |
| 6,384,847 B1 | 5/2002 | Rabenhorst |

(Continued)

FOREIGN PATENT DOCUMENTS

| CN | 1918573 | 2/2007 |
| CN | 101064025 | 10/2007 |

(Continued)

OTHER PUBLICATIONS

Malkani, Systems and method for additive manufacture, 2019, google patents, note this is a machine translation of WO2019055538 (Year: 2019).*

(Continued)

*Primary Examiner* — Robert E Fennema
*Assistant Examiner* — Yvonne Trang Follansbee
(74) *Attorney, Agent, or Firm* — Smith, Gambrell & Russell, LLP

(57) ABSTRACT

There are provided methods and systems for making or repairing a specified part. For example, there is provided a method for creating an optimized manufacturing process to make or repair the specified part. The method includes receiving by a system configured to make or repair the specified part and from a machine communicatively coupled with the system, a set of sensor data and/or inspection data associated with at least one of an additive and a reductive manufacturing or repair process or with at least one of a pre-treatment and a post-treatment step. The method includes creating an optimized manufacturing process to make or repair the specified part, the creating including. The method includes updating, in real time, a surrogate model corresponding with a physics-based model of the specified part, wherein the surrogate model forms a digital twin of the specified part. The method includes further updating the surrogate model with the sensor data and/or inspection data.

(Continued)

The method includes executing, based on the digital twin, the optimized manufacturing process to either repair or make the specified part.

19 Claims, 4 Drawing Sheets

(51) Int. Cl.
*B29C 64/188* (2017.01)
*B33Y 10/00* (2015.01)
*B33Y 30/00* (2015.01)
*B33Y 40/10* (2020.01)
*B33Y 40/20* (2020.01)
*B33Y 50/02* (2015.01)
*G05B 17/02* (2006.01)

(52) U.S. Cl.
CPC .............. *G05B 17/02* (2013.01); *B33Y 10/00* (2014.12); *B33Y 30/00* (2014.12); *B33Y 40/10* (2020.01); *B33Y 40/20* (2020.01); *B33Y 50/02* (2014.12)

(56) References Cited

U.S. PATENT DOCUMENTS

| | | |
|---|---|---|
| 6,394,646 B1 | 5/2002 | Ringermacher |
| 6,745,153 B2 | 6/2004 | White |
| 6,775,647 B1 | 8/2004 | Evans |
| 7,063,991 B1 | 6/2006 | Zhao |
| 7,242,994 B2 | 7/2007 | Ishibashi |
| 7,457,762 B2 | 11/2008 | Wetzer |
| 7,504,838 B1 | 3/2009 | Zhao |
| 7,549,789 B2 | 6/2009 | Tralshawala |
| 7,761,200 B2 | 7/2010 | Avery |
| 7,966,883 B2 | 6/2011 | Lorraine |
| 8,209,839 B1 | 7/2012 | Brostmeyer |
| 8,266,066 B1 | 9/2012 | Wezter |
| 8,423,430 B2 | 4/2013 | Avery |
| 8,692,887 B2 | 4/2014 | Ringermacher |
| 8,694,196 B1 | 4/2014 | Doulatshahi |
| 9,002,501 B1 | 4/2015 | Rodrigue |
| 9,092,592 B2 | 7/2015 | Perasso |
| 9,146,652 B1 | 9/2015 | Danielsson |
| 9,194,376 B2 | 11/2015 | Ritter |
| 9,817,452 B2 | 11/2017 | Evens |
| 9,977,425 B1 | 5/2018 | McCann |
| 10,061,300 B1 | 8/2018 | Coffman |
| 10,466,681 B1 | 11/2019 | Jones |
| 10,635,088 B1 | 4/2020 | Bandara |
| 10,860,013 B2 | 12/2020 | Dagnino |
| 10,928,809 B2 | 2/2021 | Salapakkam |
| 10,935,964 B2 | 3/2021 | Ruggiero |
| 11,103,927 B2 | 8/2021 | Tang |
| 11,209,345 B1 | 12/2021 | Madsen |
| 11,280,751 B2 | 3/2022 | Ruggiero |
| 2003/0045786 A1 | 3/2003 | Zhao |
| 2003/0115037 A1 | 6/2003 | Sumida |
| 2003/0149498 A1 | 8/2003 | Rebello |
| 2005/0102050 A1 | 5/2005 | Richey |
| 2006/0129301 A1 | 6/2006 | Ashby |
| 2006/0142886 A1 | 6/2006 | Ishibashi |
| 2007/0073429 A1 | 3/2007 | Rees |
| 2008/0103788 A1 | 5/2008 | Morris |
| 2009/0013025 A1 | 1/2009 | Soejima |
| 2009/0030752 A1 | 1/2009 | Senturk-Doganaksoy |
| 2009/0089029 A1* | 4/2009 | Sturrock ................ G06F 30/20 703/7 |
| 2009/0138518 A1 | 5/2009 | Rodgers |
| 2009/0297336 A1 | 12/2009 | Allen |
| 2010/0153080 A1 | 6/2010 | Khan |
| 2011/0137575 A1 | 6/2011 | Koul |
| 2011/0153295 A1 | 6/2011 | Yerramalla |
| 2011/0191091 A1 | 8/2011 | Joshi |
| 2011/0202297 A1* | 8/2011 | Kim ...................... G06Q 10/04 702/82 |
| 2011/0295563 A1 | 12/2011 | McDaniel |
| 2012/0078599 A1 | 3/2012 | Tryon, III |
| 2013/0139112 A1 | 5/2013 | Domke |
| 2014/0130459 A1 | 5/2014 | Lundy |
| 2014/0257547 A1 | 9/2014 | Bachrach |
| 2015/0169821 A1 | 6/2015 | Peters |
| 2017/0102287 A1 | 4/2017 | Okerson |
| 2017/0124448 A1 | 5/2017 | Engel |
| 2017/0129254 A1 | 5/2017 | Nardiello et al. |
| 2017/0176978 A1 | 6/2017 | Yagita |
| 2017/0206510 A1 | 7/2017 | Horton |
| 2017/0235848 A1 | 8/2017 | Van Dusen |
| 2017/0286572 A1* | 10/2017 | Hershey .................... B64F 5/60 |
| 2017/0323231 A1 | 11/2017 | Johnson |
| 2017/0323239 A1 | 11/2017 | Johnson |
| 2017/0323240 A1 | 11/2017 | Johnson |
| 2017/0323274 A1 | 11/2017 | Johnson |
| 2017/0323403 A1 | 11/2017 | Johnson |
| 2017/0329295 A1 | 11/2017 | Zahorcak |
| 2017/0329297 A1 | 11/2017 | Gilman |
| 2017/0343984 A1 | 11/2017 | Czinger |
| 2018/0004197 A1 | 1/2018 | Feenstra |
| 2018/0005368 A1 | 1/2018 | Nalladega |
| 2018/0027190 A1 | 1/2018 | Srinivasan |
| 2018/0054376 A1 | 2/2018 | Hershey et al. |
| 2018/0088559 A1 | 3/2018 | Salem |
| 2018/0102000 A1 | 4/2018 | Vala |
| 2018/0137219 A1 | 5/2018 | Goldfarb |
| 2018/0144277 A1 | 5/2018 | Srivastava et al. |
| 2018/0210436 A1 | 7/2018 | Burd |
| 2018/0292815 A1 | 10/2018 | Byers |
| 2018/0304370 A1 | 10/2018 | Myerberg et al. |
| 2018/0304540 A1 | 10/2018 | Tobia et al. |
| 2018/0314234 A1 | 11/2018 | Zhang |
| 2019/0001655 A1 | 1/2019 | Blom et al. |
| 2019/0004079 A1 | 1/2019 | Blom et al. |
| 2019/0049929 A1 | 2/2019 | Good et al. |
| 2019/0094108 A1 | 3/2019 | Liao |
| 2019/0146470 A1 | 5/2019 | Akkaram |
| 2019/0187679 A1 | 6/2019 | Strudwicke |
| 2019/0196449 A1 | 6/2019 | Zhang |
| 2019/0212721 A1* | 7/2019 | Kesler .............. G05B 19/41885 |
| 2019/0243933 A1* | 8/2019 | Roemerman .......... G06N 20/20 |
| 2019/0244309 A1 | 8/2019 | Ottnad |
| 2020/0031055 A1 | 1/2020 | Schumann |
| 2020/0042659 A1 | 2/2020 | Tallman |
| 2020/0162724 A1 | 5/2020 | Neser |
| 2020/0173943 A1 | 6/2020 | Ruggiero |
| 2020/0174456 A1 | 6/2020 | Ruggiero |
| 2020/0174457 A1 | 6/2020 | Salapakkam |
| 2020/0175438 A1 | 6/2020 | Ruggiero |
| 2020/0376767 A1* | 12/2020 | Huang ................... B33Y 10/00 |
| 2020/0391446 A1 | 12/2020 | Davis et al. |
| 2020/0391447 A1 | 12/2020 | Davis et al. |
| 2020/0393822 A1 | 12/2020 | Davis |
| 2020/0394351 A1* | 12/2020 | Roemerman .......... G06F 30/27 |
| 2020/0394618 A1 | 12/2020 | Davis |
| 2020/0394681 A1 | 12/2020 | Cohn et al. |
| 2022/0114304 A1* | 4/2022 | O'Connor ............... G06F 30/20 |
| 2023/0038395 A1 | 2/2023 | Davis |

FOREIGN PATENT DOCUMENTS

| | | |
|---|---|---|
| CN | 101970153 | 2/2011 |
| CN | 103558102 | 2/2014 |
| CN | 104573908 | 4/2015 |
| CN | 107113551 | 8/2017 |
| CN | 107194826 | 9/2017 |
| CN | 107636704 | 1/2018 |
| CN | 107832497 A | 3/2018 |
| CN | 107861478 A | 3/2018 |
| CN | 108241909 | 7/2018 |
| CN | 108628595 A | 10/2018 |
| CN | 108733868 A | 11/2018 |
| CN | 108780314 | 11/2018 |
| CN | 108829933 | 11/2018 |
| CN | 108919760 | 11/2018 |

(56) References Cited

FOREIGN PATENT DOCUMENTS

| | | |
|---|---|---|
| CN | 109070200 | 12/2018 |
| CN | 109202074 | 1/2019 |
| CN | 109203478 | 1/2019 |
| CN | 109203479 | 1/2019 |
| CN | 109270899 | 1/2019 |
| CN | 109313440 | 2/2019 |
| CN | 109478053 | 3/2019 |
| CN | 109599039 | 4/2019 |
| CN | 109615113 | 4/2019 |
| CN | 109690589 | 4/2019 |
| CN | 109766566 | 5/2019 |
| EP | 2350966 | 8/2011 |
| EP | 3166052 | 5/2017 |
| EP | 3210697 A1 | 8/2017 |
| EP | 3244353 | 11/2017 |
| EP | 3244353 A1 | 11/2017 |
| JP | 2007164442 | 6/2007 |
| JP | 2009015460 A | 1/2009 |
| JP | 2012155684 | 8/2012 |
| JP | 2018151575 | 9/2018 |
| WO | 2016179455 | 11/2016 |
| WO | 2017091231 | 6/2017 |
| WO | 2017152142 A1 | 9/2017 |
| WO | 2017192998 | 11/2017 |
| WO | 2018073422 | 4/2018 |
| WO | 2018073422 A2 | 4/2018 |
| WO | 2018183275 | 10/2018 |
| WO | 2019055538 | 3/2019 |
| WO | 2019055576 | 3/2019 |
| WO | 2019055576 A1 | 3/2019 |
| WO | WO-2019055538 A1 * | 3/2019 |
| WO | 2019067471 | 4/2019 |
| WO | 2019070644 | 4/2019 |
| WO | 2019070644 A2 | 4/2019 |
| WO | 2019080644 A1 | 5/2019 |
| WO | 2019103773 | 5/2019 |

OTHER PUBLICATIONS

Office Action, dated Nov. 2, 2021, for U.S. Appl. No. 16/901,205, "Additive Manufacturing-Coupled Digital Twin Ecosystem Based on Multi-Variant Distribution Model of Performance," 22 pages.
USPTO; Non-Final Office Action issued in U.S. Appl. No. No. 16/901,168 mailed Feb. 8, 2022.
U.S. Patent and Trademark Office, Final Office Action, U.S. Appl. No. 16/209,918, filed Jun. 24, 2021, 15 pp.
Benjamin Schleich et al., "Shaping the Digital Twin for Design and Production Engineering," CIRP Annals, Elsevier BV, NL, CH, FR, vol. 66, No. 1, Apr. 21, 2017, pp. 141-144.
Dennis J. Siedlak et al., "A Digital Thread Approach to Support Manufacturing-Influenced Conceptual Aircraft Design," Research in Engineering Design, Springer Verlag, London, GB, vol. 29, No. 2, Sep. 13, 2017, pp. 285-308, 24 pp.
Doom, Travis R., "Aeroderivative Gas Turbines", Aug. 31, 2013, American Energy Innovation Council, RL: http://americanenergyinnovation.org/wp-content/uploads/2013/08/Case-Gas-Turbines.pdf, 12 pages.
Horlock J. H. et al: "Turbine Blade Cooling: The Blade Temperature Distribution", Proceedings of The Institution of Mechanical Engineers. Part A, Journal of Power and Energy, vol. 220, No. 4, Jun. 1, 2006 (Jun. 1, 2006), pp. 343-353, XP055872533, GB ISSN: 0957-6509, DOI: 10.1243/09576509JPE177 Retrieved from the Internet: URL:http://journals.sagepub.com/doi/pdf/10.1243/09576509JPE177.
U.S. Patent and Trademark Office, Final Office Action, U.S. Appl. No. 16/209,918, Jun. 24, 2021, 15 pp.
U.S. Patent and Trademark Office, Final Office Action, U.S. Appl. No. 16/209,884, Jun. 17, 2021, 22 pp.
U.S. Patent and Trademark Office, Notice of Allowance and Fees Due, U.S. Appl. No. 16/209,884, Nov. 16, 2021, 10 pp.
U.S. Patent and Trademark Office, Notice of Allowance, U.S. Appl. No. 16/209,905, Oct. 27, 2020, 8 pp.
U.S. Patent and Trademark Office, Office Action, U.S. Appl. No. 16/209,918, Dec. 24, 2020, 17 pp.
U.S. Patent and Trademark Office, Office Action, U.S. Appl. No. 16/209,918, Nov. 9, 2021, 16 pp.
U.S. Patent and Trademark Office, Office Action, U.S. Appl. No. 16/209,884, Jan. 1, 2021, 19 pp.
USPTO; U.S. Appl. No. 16/901,168; Non-Final Rejection mailed Jul. 11, 2022; (pp. 1-61).
USPTO; U.S. Appl. No. 16/901,205; Notice of Allowance and Fees Due (PTOL-85) mailed May 26, 2022; (pp. 1-5).
USPTO; U.S. Appl. No. 16/901,205; Notice of Allowance and Fees Due (PTOL-85) mailed Aug. 29, 2022; (pp. 1-5).
USPTO; U.S. Appl. No. 16/901,205; Notice of Allowance and Fees Due (PTOL-85) mailed Dec. 21, 2022; (pp. 1-5).
USPTO; U.S. Appl. No. 16/901,220; Non-Final Rejection mailed Oct. 13, 2022; (pp. 1-24).
USPTO; U.S. Appl. No. 16/901,220; Non-Final Rejection mailed Aug. 24, 2023; (pp. 1-17).
USPTO; U.S. Appl. No. 16/901,220; Final Rejection mailed Nov. 30, 2023; (pp. 1-13).
USPTO; U.S. Appl. No. 17/964,681; Non-Final Rejection mailed Dec. 12, 2023; (pp. 1-16).
USPTO; U.S. Appl. No. 16/901,220; Final Rejection mailed Nov. 30, 2023; (pp. 1-11).
USPTO; U.S. Appl. No. 17/964,681; Final Rejection mailed Jun. 14, 2024; (pp. 1-18).
N N: "Commission Regulation (EC) No. 1702/2003", Sep. 24, 2003 (Sep. 24, 2003), pp. 1-74, XP093160737, https://eur-lex.europa.eu/legal-content/EN/TXT/PDF/?uri=CELEX:32003R1702.
Majid Rezazadeh Reyhani, et al. "Turbine blade temperature calculation and life estimation—a sensitivity analysis", Propulsion and Power Research, vol. 2, No. 2, Jun. 1, 2013 (Jun. 1, 2013), pp. 148-161, XP055762513, ISSN: 2212-540X, DOI: 10.1016/j.jppr.2013.04.004.
Horlock J. H. et al: "Turbine Blade Cooling: The Blade Temperature Distribution", Proceedings of The Institution of Mechanical Engineers. Part A,Journal of Power and Energy, vol. 220, No. 4, Jun. 1, 2006 (Jun. 1, 2006), pp. 343-353, XP055872533, GB ISSN: 0957-6509, DOI: 10.1243/09576509JPE177.
Jose Rios et al: 11 Framework to support 1-15 the aircraft digital counterpart concept with an industrial design view 11, International Journal of Agile Systems and Management, vol. 9, No. 3, Jan. 1, 2016 (Jan. 1, 2016) , p. 212, XP055689104, ISSN: 1741-9174, DOI: 10.1504/IJASM.2016.079934.
Schleich Benjamin et al: "Shaping the digital twin for design and production engineering", Cirp Annals, Elsevier BV, NL, CH, FR, vol. 66, No. 1, Apr. 21, 2017 (Apr. 21, 2017), pp. 141-144.
Siedlak Dennis J et al: "A digital thread approach to support manufacturing-influenced conceptual aircraft design", Research in Engineering Design, Springer Verlag, London, GB, vol. 29, No. 2, Sep. 13, 2017 (Sep. 13, 2017), pp. 285-308.
Travis R Doom: "Aeroderivative Gas Turbines", Aug. 31, 2013 (Aug. 31, 2013), XP055690065, URL: http://americanenergyinnovation.org/wp-content/uploads/2013/08/case-gas-turbines.pdf.
USPTO; U.S. Appl. No. 16/901,168; Notice of Allowance and Fees Due (PTOL-85) mailed Jan. 24, 2023; (pp. 1-17).
USPTO; U.S. Appl. No. 16/901,220; Final Rejection mailed Apr. 26, 2023; (pp. 1-24).
Knapp, et al. "Building blocks for a digital twin of additive manufacturing." Acta Materialia 135 (2017): 390-399.
Zhang, et al. "Digital twins for additive manufacturing: a state-of-the-art review." Applied Sciences 10.23 (2020): 8350, 1-10.
Wright, et al. "How to tell the difference between a model and a digital twin." Advanced Modeling and Simulation in Engineering Sciences 7 (2020), 1-13.
Fergani, et al. "A machine learning-based digital twin of the manufacturing process: metal powder-bed fusion case." (2020), 1-8, DOI: 10.31224/osf.io/736a5; retrieved from the Internet: https://www.researchgate.net/publication/339942902.

* cited by examiner

ADDITIVE MANUFACTURING-COUPLED DIGITAL TWIN ECOSYSTEM

I. CROSS-REFERENCE TO RELATED APPLICATIONS

This application claims benefit to U.S. Provisional Patent Application Nos. 62/862,011 and 62/862,016, filed on Jun. 14, 2019. The disclosures of both prior applications are incorporated herein in their entirety by reference.

II. BACKGROUND

In industrial applications the production of a component often includes considering the manufacturing process at the design stage. In such cases, the design and the manufacturing processes are closely related, meaning that design decisions may be influenced by manufacturing constraints or that manufacturing choices may result directly from aspects of the design. Moreover, operational characteristics may be influenced by the manufacturing process' capabilities. For instance, in typical industrial manufacturing processes, parts are produced according to predetermined tolerances because the as-manufactured parts that are deployed in the field may differ from their design specifications (i.e., from the as-designed parts) due to variations inherent to the manufacturing processes.

With the advent of additive manufacturing technology, another layer of complexity is introduced in the above-noted manufacturing/design/operation ecosystem because of the inherent aspects of additive processes. For example, the additive process may use layers of materials by addition to form the component and pre/post treatment steps such as heating and curing of the layers. Optimizing and validating the additive process requires quantifying and validating the variances in the manufactured components by destructive testing that produces significant quantities of scrap material dependent of the number of tolerances tested.

Destructive testing alone may validate that a manufactured component meets a specific design tolerance but not consider how the influences of multiple within tolerance variances aggregately affect performance of the component in operation or replicate the range of operating regime that components are exposed to in operation and therefore quantify the fitness of components manufactured by a process for operation. A further risk is that manufactured components with a useful and serviceable life are scrapped as the influence of variances occurring during the manufacturing cycle and the fitness of a component for operation is not quantifiable.

III. SUMMARY

The embodiments featured herein help solve or mitigate the above-noted issues as well as other issues known in the art. The embodiments featured herein integrate operational characteristics, as they are measured and analyzed during a component's life cycle, with design and manufacturing, including specific aspects of additive manufacturing processes, to create models capable of mitigating performance and manufacturing variances.

For example, the embodiments provide the ability to link as-built, as-manufactured/assembled, as-designed and as-simulated, as-tested, as-operated and as-serviced components directly through a unique digital integrated process. This digital integrated process includes specific aspects of additive manufacturing processes used at any point during a component's life cycle. In the embodiments featured herein, any hardware component has the capability to reference to its design goal and derive multiple analysis outcomes based on its hardware specifications and operational data. The novel process also provides abstraction of data types from multiple analyses to form an integrated digital twin of hardware components. Furthermore, the novel process provides a framework to increase fidelity and accuracy of a system level digital twin by aggregating sub-system component level digital twin predictions.

The embodiments featured herein provide a technological infrastructure that yield automated, quantitative, and qualitative assessments of the variability in additive manufacturing processes during the useful life of a part. Thus, in their implementation, the embodiments purposefully and effectively allow the optimization of a manufacture or repair process to make or repair components to a useful lifetime specified by the application's constraints while optimizing the quantity of material needed and destructive testing required for producing or repairing the part using one or more additive manufacturing processes. For example, and not by limitation, in the case of a component requiring a coating, an embodiment as set forth herein can provide a quantitative assessment of the amount of coating material needed to be added onto the component in order to match the performance of the component during repair or manufacturing; the amount of material identified can be optimized against cost constraints.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

Figure 4:
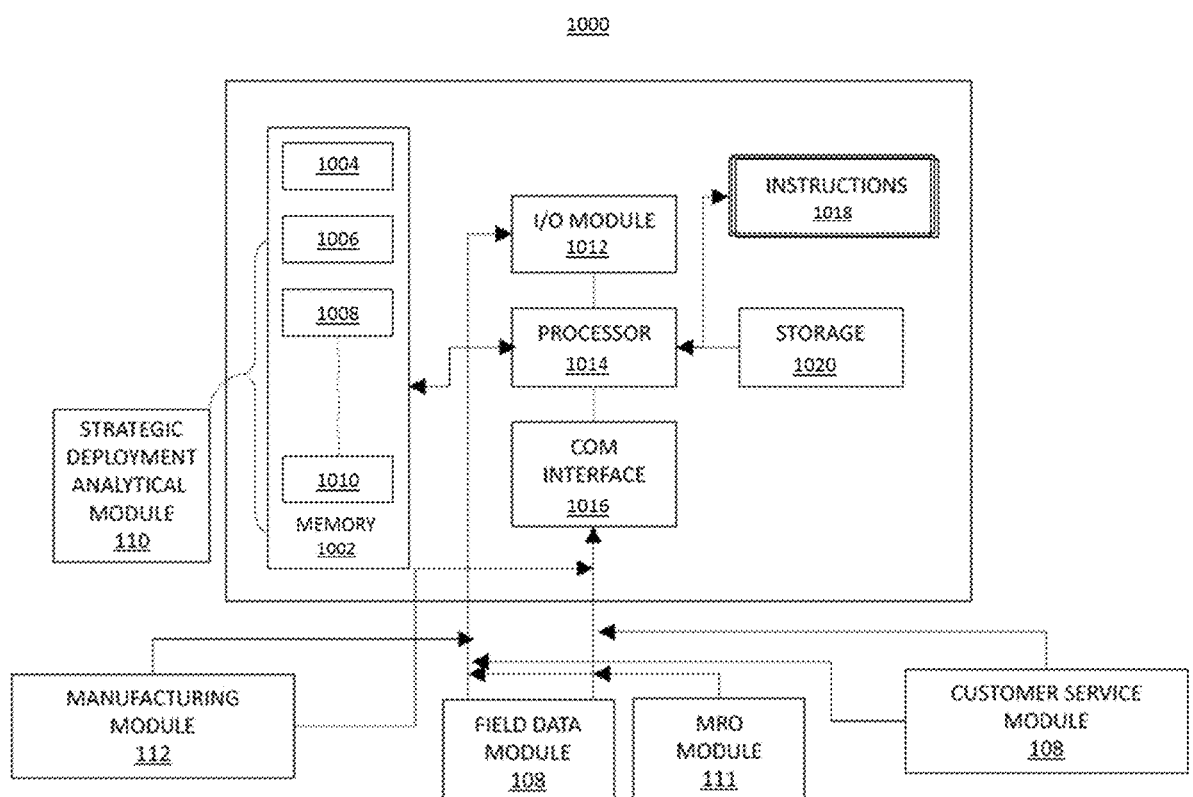

FIG. 4 an exemplary system configured to execute one or more aspects of the exemplary methods presented herein.

V. DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

The embodiments featured herein have several advantages. For example, they can allow one to make accurate assessments on the quality of new make parts relative to their design intent. They provide the ability to mix and match different manufactured components in an engine assembly to achieve a desired integrated engine performance. Furthermore, they improve time-on-wing assessments of every part and sub-assembly based on manufacturing variations, operational conditions, and as-serviced conditions. The embodiments help leverage the sub-system assembly performance using high fidelity design knowledge, and they improve prediction accuracy as required. Furthermore, they enable feedback loops that help improve subsequent designs.

Figure 1:
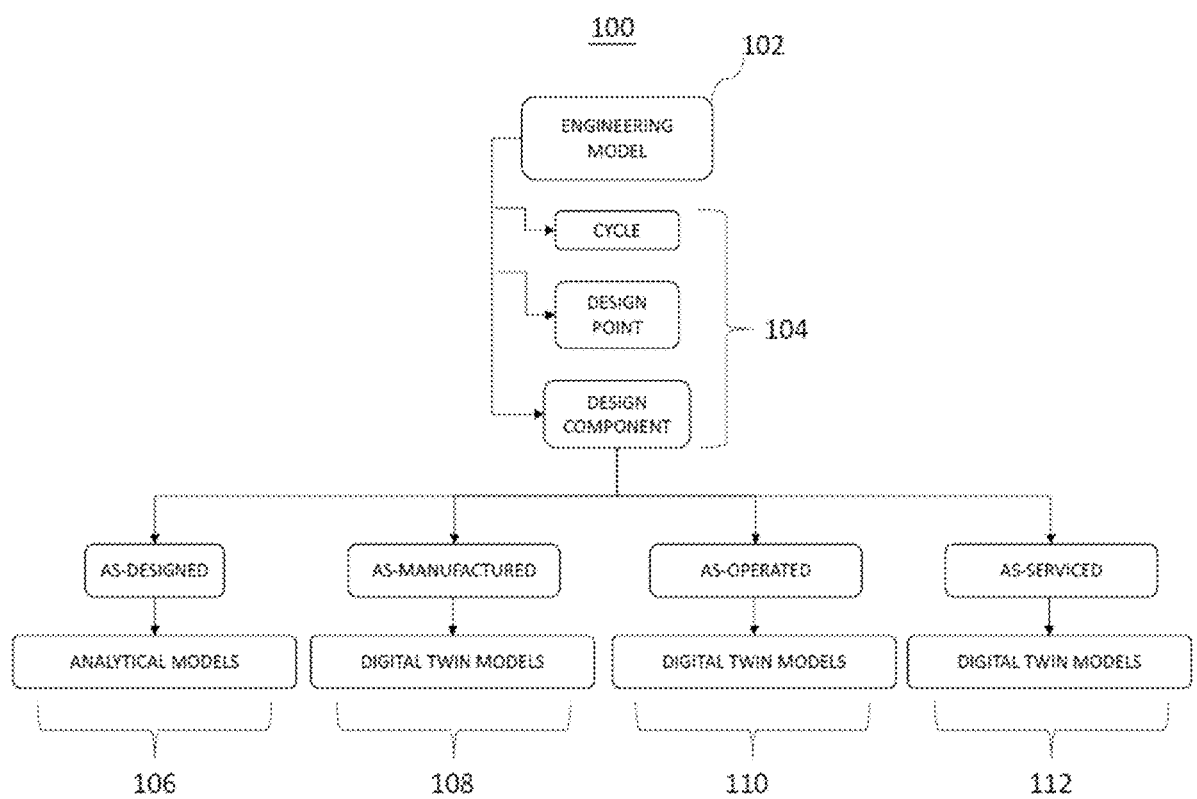
FIG. 1 illustrates a process according to an embodiment.

FIG. 1 illustrates an exemplary process 100 in accordance with an exemplary embodiment. The process 100 may be an example process associated with the lifecycle of a part and/or a general manufacturing cycle. While the process 100 is described in the context of air plane or jet engine parts, it may extend to the manufacture or in general to the lifecycle of any manufactured component. The process 100 includes a module 102 that is a product environment spectrum. In other words, the module 102 can be a database that stores information about instances of the same product as they are used in the field.

For example, the module 102 may include information about the reliability or failure of a plurality of turbine blades as they are commissioned in a fleet of engines (i.e., in two or more engines). The module 102 may be configured to organize, or present upon request from a device communicatively coupled thereto, a product environment spectrum which sorts all of the products of interest in a predetermined order.

For example, the products may be sorted based on their robustness. In one use case, the products may be sorted from more robust (102a) to least robust (102n). Generally, one or more performance criteria may be used to sort these products according to the aforementioned spectrum. In the case of a turbine blade, the products may be sorted according to their thermal robustness performance, which may be measured using one or more field inspection methods.

The product environment spectrum may be driven by constraints from customers, which may be collected and functionalized (i.e., put in the form of computer instructions) in the module 104. In other words, the robustness criteria may be dictated by application-specific parameters derived from customers. Similarly, the product environment spectrum may be driven by commercial constraints, which may be functionalized in the module 106. These constraints (for both the modules 104 and 106) may be updated as the manufacturing process is updated in view of the various sources of information, as shall be further described below.

The customer constraints of the module 104 may also drive the manufacturing functions of the module 108, which in turn drive the engineering decisions, as functionalized in the module 112. Once the engineering decisions are functionalized, they may be used to establish a digital thread that is configured for design. The digital design thread may also be updated from the constraints of the customers (module 104). This thread thus forms a digital twin which can be formed from multiple data sources representing multiple use case. In other words, the digital twin integrates multiple use cases to ensure that manufactured parts are produced according to specific performance data rather than merely producing parts according to predetermined dimensional constraints, as is done in typical manufacturing processes.

Therefore, the digital twin allows for engineering redesign based on fielded part performance. As such, the digital twin allows the optimization of a given manufacturing process in order to differentiate quality of as-manufactured parts to drive targeted performance and business outcomes.

Generally, the digital design twin may be constructed from a plurality of sources that include new make manufacturing data from the engineering model, a network and an already existing manufacturing model of the part (module 108). Data streams from the network, may include, for example and not by limitation, borescope inspection data from field inspections (either partial or full, or in some implementations, functional or dimensional inspections), on-wing probes that measure data from an engine during flight. Furthermore, generally, the digital twin of a component may include at least one of as-manufactured data, as-tested data, as-designed and as-simulated, as-operated data, and as-serviced data of the component. Furthermore, the digital twin of the component may be based on operational data or nominal operating conditions of the component.

The process 100 allows data to be collected continuously. Specifically, the digital design thread is continuously updated to provide a model reflecting actual conditions. This is done with the explicit feedback loops of the process 100, which ensure that new designs can be manufactured based the wide variety of sources of information mentioned above. As such, the process 100 provides the ability to better predict the durability of a part, as any manufactured part would have been manufactured based on conditions reflecting design, usage, servicing, etc.

In sum, the process 100 integrates and automates the various aspect of the lifecycle of the part to provide an optimized manufacturing process at an enterprise level. The process 100 further includes a score inspection module, which may be updated with field inspection analytics, in order to further augment the engineering model. The process 100 can be further understood in the context of FIG. 2, which depicts the digital twin ecosystem 200 featuring exemplary relationships between the as-designed, as manufactured, as-tested, as-serviced, and as-operated aspects of a specified part during its life cycle. The digital twin ecosystem 200 includes aspects which accounts for additive manufacturing process variance, as shall be described in further detail below.

Figure 3:
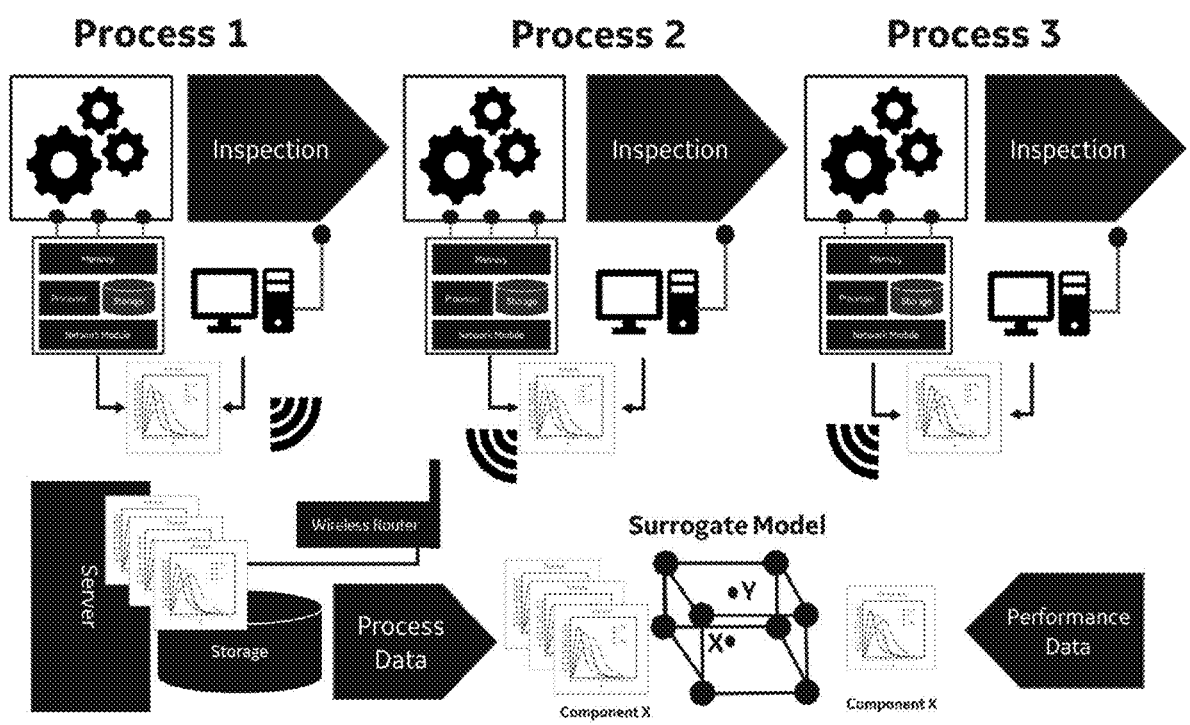
FIG. 3 illustrates an exemplary system according to an aspect of an embodiment.

FIG. 3 illustrates a system 300 configured to executed a method for creating an optimized manufacturing process to make or repair the specified part. The method includes receiving by a system configured to make or repair the specified part and from a machine communicatively coupled with the system, a set of sensor or inspection data associated with at least one of an additive and a reductive manufacturing or repair process or with at least one of a pretreatment and a post-treatment step.

The method includes creating an optimized manufacturing process to make or repair the specified part, the creating including. The method includes updating, in real time, a surrogate model corresponding with a physics-based model of the specified part, wherein the surrogate model forms a digital twin of the specified part. The method includes further updating the surrogate model with the sensor data or inspection data. The method includes executing, based on the digital twin, the optimized manufacturing process to either repair or make the specified part. Furthermore, in an embodiment, inspection measurements recorded pre/during/post additive/reductive/treatment step can be collated with sensor data and component or batch of components being manufactured/repaired.

Figure 2:
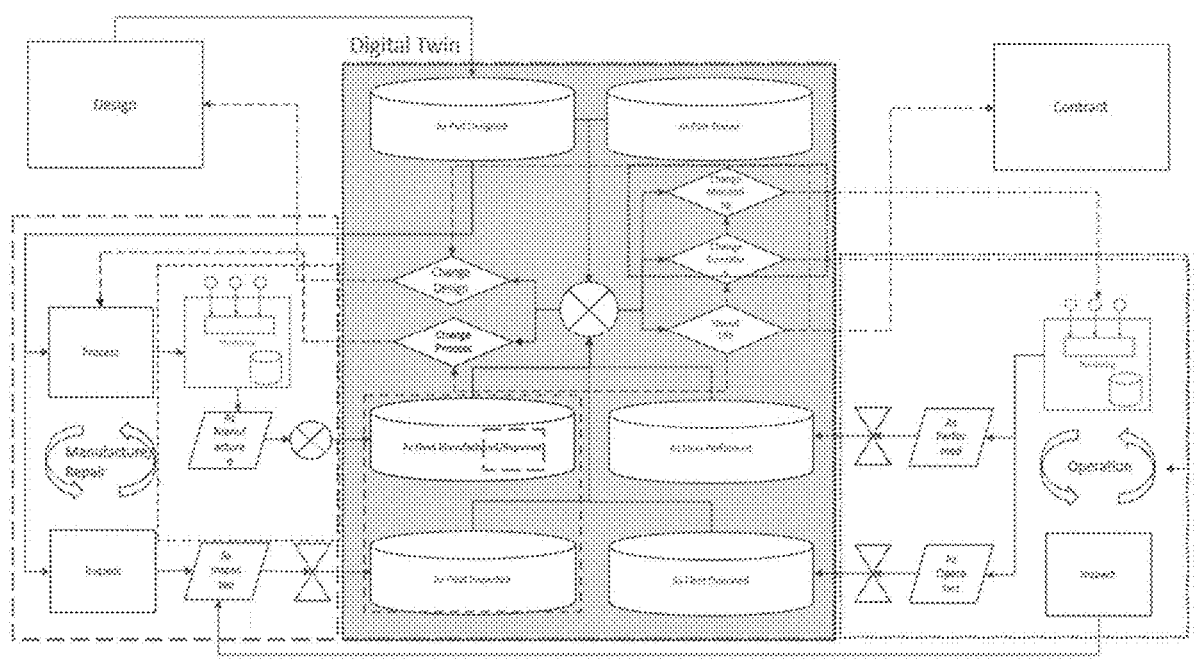
FIG. 2 illustrates a digital twin ecosystem according to an embodiment.

FIG. 4 depicts a system 1000 that executes the various operations described above in the context of the exemplary digital twin ecosystem described in the processes described in regards to FIGS. 1-3. The system 1000 includes an application-specific processor 1014 configured to perform tasks specific to optimizing a manufacturing process according to the 100. The processor 1014 has a specific structure imparted by instructions stored in a memory 1002 and/or by instructions 1018 that can be fetched by the processor 1014 from a storage 1020. The storage 1020 may be co-located with the processor 1014, or it may be located elsewhere and be communicatively coupled to the processor 1014 via a communication interface 1016, for example.

The system 1000 can be a stand-alone programmable system, or it can be a programmable module located in a much larger system. For example, the system 1000 be part of a distributed system configured to handle the various modules of the process 100 described above. The processor 1014 may include one or more hardware and/or software components configured to fetch, decode, execute, store, analyze, distribute, evaluate, and/or categorize information.

The processor 1014 can include an input/output module (I/O module 1012) that can be configured to ingest data pertaining to single assets or fleets of assets. The processor 1014 may include one or more processing devices or cores (not shown). In some embodiments, the processor 1014 may be a plurality of processors, each having either one or more cores. The processor 1014 can be configured to execute instructions fetched from the memory 1002, i.e. from one of memory block 1004, memory block 1006, memory block 1008, and memory block 1010.

Furthermore, without loss of generality, the storage 1020 and/or the memory 1002 may include a volatile or non-volatile, magnetic, semiconductor, tape, optical, removable, non-removable, read-only, random-access, or any type of non-transitory computer-readable computer medium. The storage 1020 may be configured to log data processed, recorded, or collected during the operation of the processor 1014. The data may be time-stamped, location-stamped, cataloged, indexed, or organized in a variety of ways consistent with data storage practice. The storage 1020 and/or the memory 1002 may include programs and/or other information that may be used by the processor 1014 to perform tasks consistent with those described herein.

For example, the processor 1014 may be configured by instructions from the memory block 1006, the memory block 1008, and the memory block 1010, to perform real-time updates of a model for a part based on a variety of input sources (e.g. a network and/or a field data module 108). The processor 1014 may execute the aforementioned instructions from memory blocks, 1006, 1008, and 1010, and output a twin digital model that is based on data from the wide variety of sources described above. Stated generally, from the continuous updates, the processor 1014 may continuously alter the strategy deployment module 110 that includes the model for the part based on the prognostic deployment or degradation models described in the context of FIG. 2-9.

The embodiments provide the capability to improve time on wing assessments of every part and its sub-assembly based on manufacturing variations, operational conditions and as-serviced data. Furthermore, the embodiments help leverage the sub-system assembly performance using high fidelity design knowledge and improve prediction accuracy as required, and they enable feedback loop that help improve subsequent designs.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system for making or repairing a specified part, the system including:
   a processor; and
   a memory including instructions that, when executed by the processor, cause the processor to perform operations comprising:
      receiving, from a machine communicatively coupled with the processor, a set of data including at least one of sensor data or inspection data, the set of data associated with at least one of an additive manufacturing process, a reductive manufacturing process, a repair process, a pre-treatment step, or a post-treatment step, wherein the set of data is for manufactured parts similar to the specified part;
      creating an optimized manufacturing process to make or repair the specified part, the creating including:
         generating, in real time, a surrogate model corresponding with a physics-based model of the specified part as-manufactured, wherein the surrogate model forms a digital twin of the specified part, wherein the digital twin includes: a first model including a relationship between the set of data and the physics-based model; and a second model of a spectrum of operating environments and as-operated data acquired from actual performance of the manufactured parts over a lifetime of the manufactured parts as operated while deployed in the field, the as-operated data acquired from actual performance of the manufactured parts similar to the specified part as operated while deployed in the field across the spectrum of operating environments, the operating environments including operational conditions that the manufactured parts similar to the specified part are exposed to in operation in the field; and
         determining a process parameter for the optimized manufacturing process based on the surrogate model and a target performance for the specified part as operated in the field; and
      executing, based on the digital twin, the optimized manufacturing process to either repair or make the specified part, the optimized manufacturing process implementing the process parameter.

2. The system as set forth in claim 1, wherein the operations further include communicating the set of data to a central server.

3. The system as set forth in claim 2, wherein the process parameter is a quantity of material to be added to the specified part; and wherein the set of data includes a quantity of material added to the manufactured parts similar to the specified part.

4. The system as set forth in claim 1, wherein the operations further include associating the set of data to a unique identifier of the specified part; and wherein the unique identifier is a serial number of a component or a serial number of a batch of components.

5. The system as set forth in claim 4, wherein the operations further include associating the set of data from a single process step or multiple process steps.

6. The system as set forth in claim 5, wherein the operations further include collating the set of data from the single process step or the multiple process steps.

7. The system as set forth in claim 2, wherein the operations further include, collating, by the central server, the set of data to a unique identifier of a component or batch of components of the specified part.

8. The system as set forth in claim 7, wherein the operations further include correlating the unique identifier with the as-operated data.

9. The system as set forth in claim 7, wherein the operations further include correlating the unique identifier with the surrogate model.

10. The system as set forth in claim 1, wherein the operations further include deploying the specified part based on the surrogate model.

11. The system as set forth in claim 1, wherein the digital twin is based on at least one of as-manufactured, as-tested, as-designed, and as-simulated data for the specified part.

12. The system as set forth in claim 1, wherein the operations further include predicting durability of the specified part based on the digital twin.

13. The system as set forth in claim 1, wherein the operations further include receiving data indicative of the spectrum of operating environments.

14. The system as set forth in claim 13, wherein the operations further include sorting the specified part based, at least in part, on the spectrum of operating environments.

15. The system as set forth in claim 1, wherein the operations further include sorting the specified part according to one or more performance criteria.

16. The system as set forth in claim 15, wherein the one or more performance criteria includes robustness.

17. The system as set forth in claim 16, wherein the operations further include assigning the specified part to a particular operating environment within the spectrum of operating environments based on the one or more performance criteria.

18. The system as set forth in claim 1, wherein the operations further include receiving the as-operated data, wherein the as-operated data is associated with a part of the same type as the specified part.

19. The system as set forth in claim 18, wherein creating further includes updating the surrogate model based on the as-operated data.

* * * * *